United States Patent [19]
Wilson

[11] Patent Number: 5,639,242
[45] Date of Patent: Jun. 17, 1997

[54] CHILDREN'S EDUCATIONAL DAILY RESPONSIBILITIES LEARNING SYSTEM IN GAME FORMAT

[76] Inventor: Laura Lee Wilson, 311 S. Anthony Ave., Anthony, Kans. 67003

[21] Appl. No.: 545,942

[22] Filed: Oct. 23, 1995

[51] Int. Cl.$^6$ ............................................. G09B 19/00
[52] U.S. Cl. .................................... 434/238; 273/249
[58] Field of Search ............................ 434/238, 128, 434/129, 236; 273/249, 242, 243, 244

[56] References Cited

U.S. PATENT DOCUMENTS

| | | | |
|---|---|---|---|
| 2,340,139 | 1/1944 | Norford | 35/23 |
| 2,414,614 | 1/1947 | Shurick | 35/23 |
| 2,512,485 | 6/1950 | Cougias | 35/23 |
| 2,883,765 | 4/1959 | Blaine | 35/23 |
| 2,965,978 | 12/1960 | Olson | 35/23 |
| 3,035,355 | 5/1962 | Holmes | 35/23 |
| 3,566,489 | 3/1971 | Sonnaband | 434/128 |
| 3,782,009 | 1/1974 | Darnell | 35/23 |
| 3,862,615 | 1/1975 | Liou | 116/135 |
| 4,109,918 | 8/1978 | Mele et al. | 273/256 |
| 4,354,684 | 10/1982 | McKinley | 273/249 |
| 4,384,855 | 5/1983 | Walsh | 434/238 |
| 4,449,710 | 5/1984 | Davis | 273/249 |
| 4,741,701 | 5/1988 | Kossor | 434/238 |
| 4,776,799 | 10/1988 | Walsh | 434/238 |
| 4,909,740 | 3/1990 | Rankin | 434/238 |
| 4,947,149 | 8/1990 | Armstrong | 273/249 |
| 5,013,246 | 5/1991 | Doyle | 434/238 |
| 5,071,134 | 12/1991 | Burrouchs, Jr. | 273/249 |
| 5,190,292 | 3/1993 | Perry | 273/243 |
| 5,190,459 | 3/1993 | Determan | 434/238 |
| 5,211,402 | 5/1993 | Ferguson et al. | 273/249 |
| 5,273,431 | 12/1993 | Clarouhas | 434/129 |
| 5,295,834 | 3/1994 | Saunders | 434/128 |
| 5,360,216 | 11/1994 | Counterman | 273/243 |
| 5,372,509 | 12/1994 | Brocato et al. | 434/238 |
| 5,429,373 | 7/1995 | Chelko et al. | 273/440 |
| 5,470,235 | 11/1995 | Papaleo | 434/238 |
| 5,473,086 | 12/1995 | Aylett | 273/243 |

*Primary Examiner*—Paul J. Hirsch

[57] ABSTRACT

An educational device for motivating, monitoring and rewarding children's task performance or the like, that is motivational, fun and easy to use, in a continuous game format. A learning system 8 is typically comprised of a base material 10, having a plurality of sides and edges, with one side designated as a playing surface 12, on which is demarcated an area resembling a road 14 in a continuous circuit form. The system 8 can be mounted to any flat vertical surface by means of mounting pads 36. Loop fastener material 18a is attached to a plurality of discrete areas 16a within the road area 14, and the discrete areas 16a are organized into a circuitous route. A second plurality of discrete areas 16b with loop fastener material 18b attached, form temporary playing piece 32 waiting areas. The system 8 utilizes separate areas 20 and 22 to identify the start and reward positions 20 and 22. Hook fastener material 34 affixed to a playing piece 32 allows the playing piece 32 to be attached to the loop fastener material 18a and 18b of discrete areas 16a and 16b. A plurality of hooks 26 is attached to the base material 10 by means of mounting pads 36. A plurality of chore cards 28 is used to delegate tasks to be accomplished by the participant. A plurality of banking cards 38 is used by participants to record their rewards earned by task completions. Chore cards 28 and banking cards 18 are stored on the hooks 26.

3 Claims, 3 Drawing Sheets

5,639,242

CHILDREN'S EDUCATIONAL DAILY RESPONSIBILITIES LEARNING SYSTEM IN GAME FORMAT

BACKGROUND

1. Field of Invention

This invention relates generally to educational devices, and specifically to a unique, simple and fun learning system that motivates, monitors and reinforces children's performance of daily household chores, tasks and responsibilities.

2. Description of Prior Art

It has been a problem to provide children, especially preschool-aged children who are not yet able to read, with a positive motivational tool to encourage them to perform daily household chores, tasks and responsibilities.

To date, all attempts to solve this problem have been through the use of charts, in essentially three formats—calendar, graph and list.

In general, charts suffer from the following disadvantages:

(1) Participants must be able to read;
(2) There is no immediate positive feedback;
(3) They require too much adult involvement and time;
(4) They are age-specific within a narrow range;
(5) They cannot be used for more than one child at a time;
(6) They are consumable and must be replaced when the allotted space is filled;
(7) They are not easily adaptable to fit a wide range of situations; and
(8) They do not teach the concept and value of money.

U.S. Pat. No. 4,384,855 to Walsh (1983) discloses a calender-like apparatus with list and graph characteristics. At the end of each week the child is rewarded for each completed task. An obvious problem occurs when the tasks to be performed outnumber the available task slots, which either limits the use of the apparatus or requires the purchase of additional slot modules. In addition, the apparatus can only be used by one child, requiring the purchase of additional units for other children, thus making it inconvenient and too costly for some families.

Although plain graph paper and commercial graph charts and calendars, used in combination with child appropriate stickers, are less expensive and readily available, they do not solve the problem that an adult has to develop the system and put it to effective use for household duties, devise a reward system, and use separate charts for each child. They also use minimal child interaction which lessens the motivational impact, they are consumable and must be replaced when filled, and they lack continuity unless ample supplies are kept on hand.

There remains a need for a new and improved children's educational daily responsibilities learning system as demonstrated by this invention which addresses the disadvantages discussed above.

OBJECTS AND ADVANTAGES

Several objects and advantages of my invention are:

(1) To provide a learning system that does not require that participants be able to read;
(2) To provide a learning system that renders immediate positive feedback;
(3) To provide a learning system with continuity that is simple and easy to use;
(4) To provide a learning system that can be used by children as young as 3 years old;
(5) To provide a learning system that can be used by several children at one time;
(6) To provide a learning system that is not consumable and accommodates a plurality of tasks;
(7) To provide a learning system that is easily adaptable to fit a wide range of situations; and
(8) To provide a learning system that teaches the concept and value of money.

Additionally, my invention encourages participation by using a game format. Children perceive the accomplishment of the tasks to be fun. Further objects and advantages of my invention will become apparent from a consideration of the drawings and descriptions.

DRAWING FIGURES

REFERENCE NUMERALS IN DRAWINGS

8—learning system
10—base material
12—playing surface
14—demarcated area resembling a road
16a—area for pressure sensitive adhesive backed loop fastener material—short pieces
16b—area for pressure sensitive adhesive backed loop fastener material—long pieces
18a—pressure sensitive adhesive backed loop fastener material—short piece
18b—pressure sensitive adhesive backed loop fastener material—long piece
20—starting position labeled "GO"
22—reward position labeled "PAY DAY"
24—color-coded dots for hook placement
26—hook
28—chore card
30—color-coded dots for player identification
32—playing piece
34—pressure sensitive adhesive backed hook fastener material
36—pressure sensitive adhesive backed mounting pad
38—banking card

DESCRIPTION OF INVENTION

Figure 1:
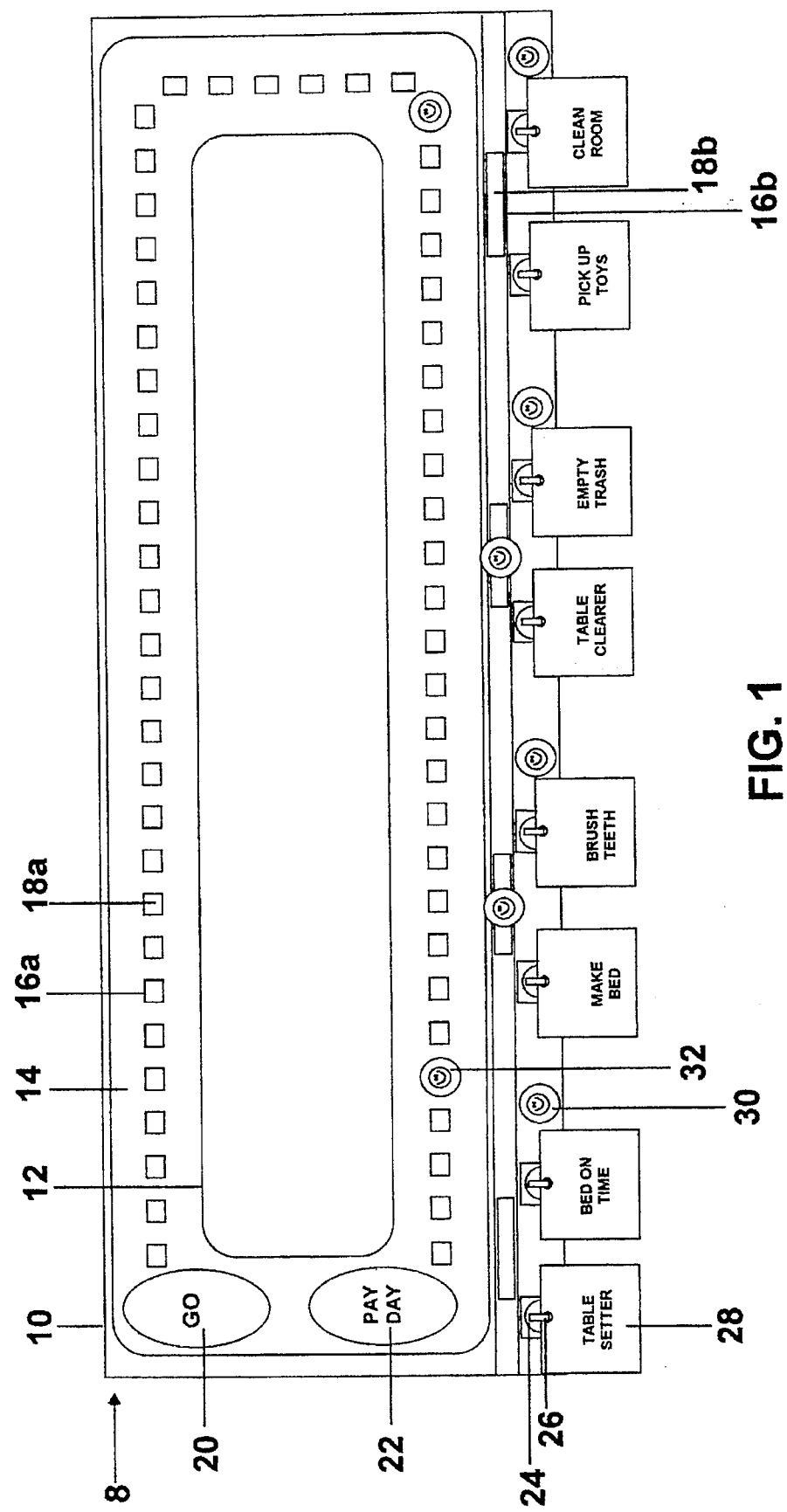
FIG. 1 is a front view of the present invention and all the presently preferred embodiments thereof.

FIG. 1, illustrates a front view of a learning system 8 in accordance with the present invention, with its presently preferred embodiments. The learning system 8 is generally composed of a base material 10 having a plurality of sides and edges, with one side defined as a playing surface 12. On the playing surface 12 is a demarcated area resembling a road 14, bounded by two continuous lines, within which is located a plurality of discrete areas 16a. These discrete areas 16a are associated with a loop fastener material 18a. The loop fastener material 18a is attached to the discrete areas 16a by means of a pressure sensitive adhesive. A single area 20, which in FIG. 1 is labeled "GO", is at one end of the road 14, and a second single area 22, which in FIG. 1 is labeled "PAY DAY", is at the other end of the road 14. The playing surface 12 of FIG. 1 also includes a second plurality of discrete areas 16b, which is also associated with the loop fastener material 18b. The loop fastener material 18b is attached to the discrete areas 16b by means of a pressure sensitive adhesive. The playing surface 12 further contains a plurality of color-coded dots 24 which are associated with a plurality of hooks 26. The hook 26 is attached to the color-coded dot 24 by means of a pressure sensitive adhesive backed mounting pad 36, which is better illustrated in FIG. 2. The hooks 26 are associated with a plurality of color-coded chore cards 28. The chore card 28 is better illustrated in FIG. 3. A second plurality of color-coded dots 30 is used for player identification. FIG. 1 further illustrates a plurality of color-coded playing pieces 32 which are attached to the loop fastener material 18a and 18b by means of a hook fastener material 34, and is further illustrated in FIG. 2.

Figure 2:
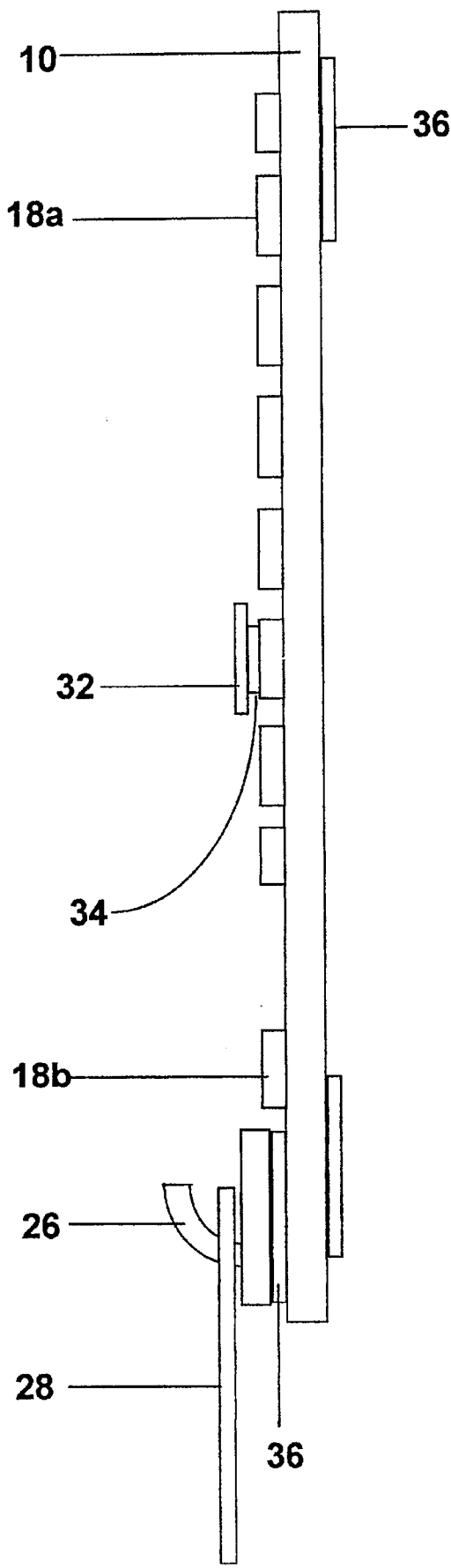
FIG. 2 is a right-side view of FIG. 1.

FIG. 2 illustrates the right-side view of FIG. 1, with its presently preferred embodiments. The hook fastener material 34 is attached to the playing piece 32 by means of a pressure sensitive adhesive. The hook fastener material 34 and loop fastener material 18a and 18b form a temporary bond that can be broken with a slight pulling force. This allows the playing piece 32 to be attached to and removed from the loop fastener material 18a and 18b. It further allows the playing piece 32 to remain attached to the playing surface 12 when the base material 10 is positioned on a wall or other flat vertical surface. The hook 26 is attached to the playing surface 12 by means of the pressure sensitive adhesive backed mounting pad 36. The mounting pad 36 is attached to the hook 26 by means of a pressure sensitive adhesive. The mounting pads 36 are also used to attach the base material 10 to a wall or other flat vertical surface, such as an appliance. The fight-side view of the hook 26 also shows the side view of the chore card 28 as it would hang on the hook 26.

Figures 3, 4:
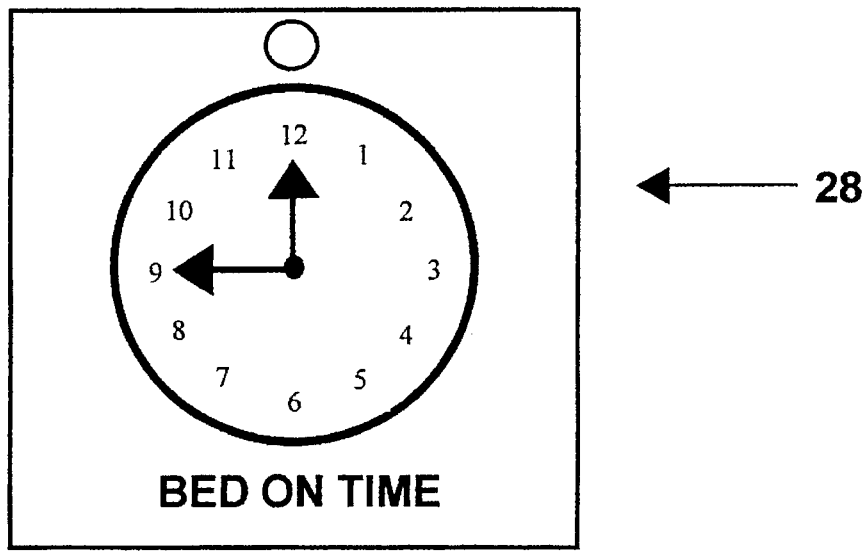
FIG. 3 is a front view of a chore card
FIG. 4 is a from view of a banking card.

FIG. 3 illustrates the pictorial and text side of the chore card 28. Each chore card 28 is illustrated with a picture of the written task. Each chore card 28 is hole-punched to enable it to be hung on the hook 26.

FIG. 4 illustrates the descriptive side of a banking card 38. The banking card 38 is utilized to record a participant's reward activity. The banking card 38 is hole-punched to enable it to be hung on the hook 26.

OPERATION OF INVENTION

My invention motivates, monitors and rewards children's accomplishments of daily household duties. It is suitable for use with a wide age range of children, including those as young as three years of age, and serves not only an educational purpose, but is also fun and simple to use. It is a continuous system 8 that will accommodated more than one child at a time.

As shown in FIG. 1, the learning system 8 is comprised of the base material 10 with one side defined as the playing surface 12 which includes a demarcated area resembling a road 14. Within the road area 14 is the plurality of discrete areas 16a to which the pressure sensitive adhesive backed loop fastener material 18a is attached. As will be explained in further detail later, the road 14 is the area used by children to record their task performance progress, starting from the area labeled "GO" 20, until the area labeled "PAY DAY" 22 is reached. The road 14 is a continuous circuit, and the discrete areas 16a are organized into a circuitous route. My invention allows a child to start over once the area labeled "PAY DAY" 22 has been reached.

The playing surface 12 includes a second plurality of discrete areas 16b below the road 14, and above and between each set of color-coded dots 24. These discrete areas 16b also have pressure sensitive adhesive backed loop fastener material 18b attached to them. These areas are known as "parking garages", which will be explained in further detail later.

The color-coded dots 24 are used as a reference site to position the hooks 26. The hooks 26 are attached to the color-coded dots 24 by means of the pressure sensitive adhesive backed mounting pad 36. There is one set of hooks 26 for each child. The use of the child's set of hooks 26, on which is hung the child's chore cards 28, will be explained in further detail later. Positioned near each set of hooks 26 is the color-coded dot 30. This color-coded dot 30 is used to identify each child's set of hooks 26.

Each playing piece 32 is a different color, to distinguish one child's playing piece 32 from the others. The playing piece 32 has pressure sensitive adhesive backed hook fastener material 34 attached to it.

As shown in FIG. 1, my invention also utilizes the banking card 38 which is used to keep a record of one child's rewards.

The use of my invention begins by attaching the base material 10 to a flat, vertical surface, such as a wall or appliance, with pressure sensitive adhesive backed mounting pads 36. This is done by attaching mounting pads 36 to the side of the base material 10 opposite the playing surface 12 and then attaching the mounting pads 36 to a wall or appliance. This allows the invention to be mounted vertically, much like a poster.

The child then chooses a playing piece 32. The child uses the chore cards 28 and set of hooks 26 which are the same color as the playing piece 32. Each chore card 28 is hole-punched to enable it to be hung on the hook 26. A parent or other adult chooses which daily tasks the child is to complete from the chore cards 28. Each chore card 28 has a written task, as well as the picture resembling the task, depicted on it, such as: "Brush Your Teeth", "Pick Up Toys", "Bed On Time", or "Empty The Trash". Chore cards 28 representing uncompleted tasks remain on the left hook 26 of the child's set of hooks 26 until the child has completed the task represented by the assigned chore card 28. Once a task has been completed, the child moves the chore card 28 representing the completed task to the right hook 26 of the child's set of hooks 26. This helps the child to learn to move from left to fight and keeps the chore cards 28 representing the uncompleted and completed tasks separated.

At a predetermined time, usually the evening, the adult and child count the completed chore cards 28 that have been hung on the right hook 26. The chore cards 28 are usually each worth one discrete area 16a move. The value can, however, be customized to allow for additional moves. This is an added motivational feature that allows the adult to encourage the child to perform less-preferred tasks.

Once the chore cards 28 have been counted, the child move the playing piece 32 the appropriate number of discrete areas 16a toward the area labeled "PAY DAY" 22. The hook fastener material 34 attached to the playing piece 32 allows the playing piece 32 to be temporarily attached to the loop fastener material 18a attached to the discrete areas 16a. Movement progresses toward the area labeled "PAY DAY" 22 as the child accomplishes more tasks. When the child's playing piece 32 reaches the area labeled "PAY DAY" 22, the adult rewards the child for the child's collectively completed tasks. If the adult has chosen a monetary reward, the amount earned is recorded on the child's banking card 38, which has areas represented on it similar to a check book register. The adult can use the banking card 38 to help the child learn the concept and value of money. The banking cards 38 may also be used to record non-monetary rewards by simply writing the reward earned on the banking card 38.

When my invention is used by more than one child at a time, it is possible for one child's playing piece 32 to land on the discrete area 16a occupied by another child's playing piece 32. When this occurs, the playing piece 32 that cannot land on the discrete area 16a because it is already occupied by another playing piece 32 is temporarily moved onto the discrete area 16b with the loop fastener material 18b attached to it, known as the "parking garage", to wait until the next time its movement is to occur. Each child has a "parking garage" area 16b located above the set of hooks 26 that child is using. The child's playing piece 32 that cannot land on the occupied discrete area 16a always moves onto the occupying child's "parking garage" area 16b. The next time movement is to occur, the child on the "parking garage" area 16b always moves first, counting from the discrete area 16a occupied by the child whose "parking garage" area 16b was used. This keeps the child who has moved onto a "parking garage" area 16b from losing his or her place.

CONCLUSION, RAMIFICATIONS, AND SCOPE OF THE INVENTION

Thus, it is apparent that my educational daily responsibilities learning system invention provides a motivational and fun, yet simple to use, tool that is easily adaptable for a wide age range of children and can accommodate more than one child at a time.

While the description above contains many specificities, these should not be construed as limitations on the scope of my invention, but rather as exemplifications of the presently preferred embodiments thereof. Many other variations are possible. For example: the chore cards can have other sizes, shapes, colors, descriptive text and pictures, and can be used for other teaching applications besides household duties; the system can accommodated any number of participants; the playing surface is not limited to a road resemblance; the start and reward areas can have other sizes, shapes and labels; the playing pieces can have other sizes, shapes, and colors; the mounting pads can be changed to magnets, clips or other such devices; the loop and hook fastener material can be changed to magnets, slots, peg holes or other means of holding the playing piece to the surface of the system; the base material can have other sizes and shapes, and be made from a variety of material; the demarcated areas can be other sizes, shapes and colors; the system is not limited to household applications; the system is not limited to use by children; the system is not limited to a vertical configuration.

Accordingly, the scope of my invention should not be limited or determined by the embodiments illustrated, but by the appended claims and their legal equivalents.

I claim:
1. An educational task and learning accomplishment device for motivating, monitoring and rewarding task and learning performance comprising:
   (a) a base material having a plurality of sides and edges, with one side of said base material being defined as a playing surface,
   (b) a plurality of discrete areas on said playing surface,
   (c) a plurality of playing pieces associated with said discrete areas,
   (d) an attachment means for temporarily attaching said playing pieces to said discrete areas,
   (e) a plurality of cards for directing tasks and learning duties,
   (f) a second plurality of cards for recording rewards for task and learning performance, and
   (g) an attachment means for temporarily attaching said cards to said playing surface,
whereby a user's task and learning accomplishments can be motivated, monitored and rewarded.

2. A method for utilizing an educational task and learning accomplishment system by one or more participants comprising the steps of:
   (a) providing a system apparatus and said apparatus having thereon a defined playing surface and said playing surface having thereon a plurality of discrete areas and said discrete areas being associated with a plurality of playing pieces and with an attachment means for temporarily attaching said playing pieces to said discrete areas,
   (b) providing a plurality of cards for directing task and learning duties and providing a second plurality of cards for recording rewards and with an attachment means for temporarily attaching said cards to said playing surface,
   (c) assigning each participant a playing piece, and
   (d) assigning each participant a plurality of task and learning cards and a reward card.

3. The method of claim 2 further comprising the steps of:
   (a) advancing said playing piece according to the completion of assigned task and learning duties along certain of said discrete areas organized into a circuitous route,
   (b) sidetracking said playing piece to certain of said discrete areas used as waiting areas because a circuitous route discrete area is already occupied by another participant's playing piece, and
   (c) rewarding each participant for completing said circuitous route,
whereby a participant's task and learning accomplishments can be motivated, monitored and rewarded continuously in a fun and simple manner.

* * * * *